United States Patent
Johnson

(10) Patent No.: US 9,946,635 B2
(45) Date of Patent: Apr. 17, 2018

(54) SYNCHRONIZING MULTI-SYSTEM PROGRAM INSTRUCTION SEQUENCES

(71) Applicant: INTERNATIONAL BUSINESS MACHINES CORPORATION, Armonk, NY (US)

(72) Inventor: Neil A. Johnson, Cornwall, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/868,412

(22) Filed: Sep. 29, 2015

(65) Prior Publication Data

US 2017/0091080 A1    Mar. 30, 2017

(51) Int. Cl.
G06F 9/44     (2006.01)
G06F 11/36    (2006.01)
G06F 9/48     (2006.01)

(52) U.S. Cl.
CPC ........ G06F 11/3684 (2013.01); G06F 9/4881 (2013.01); G06F 11/3688 (2013.01)

(58) Field of Classification Search
CPC . G06F 11/3466; G06F 11/3688; G06F 9/4881
USPC ......... 717/124, 130, 127; 718/102, 106, 107
See application file for complete search history.

(56) References Cited

U.S. PATENT DOCUMENTS

| | | | | |
|---|---|---|---|---|
| 5,542,088 A * | 7/1996 | Jennings, Jr. | ......... | G06F 9/4881 718/103 |
| 5,581,691 A * | 12/1996 | Hsu | ......................... | G06F 9/466 714/15 |
| 5,671,431 A | 9/1997 | Knopp | | |
| 6,470,376 B1 * | 10/2002 | Tanaka | ................ | G06F 9/30087 375/E7.093 |
| 6,725,239 B2 | 4/2004 | Sherman et al. | | |
| 7,137,087 B1 * | 11/2006 | Mohanty | ........ | G01R 31/318364 716/106 |
| 7,174,551 B2 * | 2/2007 | Bakow | .................. | G06F 9/5038 718/100 |
| 7,200,766 B2 | 4/2007 | Furhrer et al. | | |

(Continued)

OTHER PUBLICATIONS

Buntinas et al., "Application-Bypass Broadcast in MPICH over GM," The 3rd IEEE/ACM International Symposium on Cluster Computing and the Grid (CCGRID'03), 2003, pp. 1-8.

(Continued)

*Primary Examiner* — Phillip H Nguyen
(74) *Attorney, Agent, or Firm* — Cantor Colburn LLP; William A. Kinnaman, Jr.

(57) ABSTRACT

A method comprises receiving a list of steps with a step associated with a first work unit and a step associated with a second work unit, the first work unit is operative to process the list of steps by determining whether a first step in the list of steps is associated with the first work unit, determining whether a step sequentially listed prior to the first step has been completed responsive to determining that the first step in the list of steps is associated with the first work unit, processing the first step and designating the first step complete responsive to determining that the step sequentially listed immediately prior to the first step has been completed, determining whether a second step in the list of steps is associated with the first work unit.

14 Claims, 4 Drawing Sheets

(56) References Cited

U.S. PATENT DOCUMENTS

| | | | |
|---|---|---|---|
| 8,612,510 B2* | 12/2013 | Dean | G06F 17/30445 709/201 |
| 9,104,811 B1* | 8/2015 | Cohen | G06F 8/30 |
| 2004/0111284 A1* | 6/2004 | Uijttenbroek | G06Q 10/10 705/52 |
| 2005/0149930 A1 | 7/2005 | Doggett | |
| 2005/0251657 A1* | 11/2005 | Boucher | G06F 9/3004 712/218 |
| 2006/0064399 A1* | 3/2006 | De Sio | G06F 17/3089 |
| 2006/0184946 A1* | 8/2006 | Bishop | G06F 9/30101 718/102 |
| 2009/0164861 A1* | 6/2009 | Tseng | G06F 11/263 714/739 |
| 2009/0177873 A1* | 7/2009 | Sato | G06F 21/54 712/233 |
| 2010/0180260 A1* | 7/2010 | Chikkadevaiah | G06F 11/3688 717/125 |
| 2010/0269102 A1* | 10/2010 | Latorre | G06F 9/3842 717/130 |
| 2011/0276783 A1* | 11/2011 | Golla | G06F 9/3851 712/200 |
| 2012/0272247 A1* | 10/2012 | Scott | G06F 9/4881 718/108 |
| 2015/0046688 A1* | 2/2015 | Inoue | G06F 11/00 712/227 |

OTHER PUBLICATIONS

Krinke, Jens, "Static Slicing of Threaded Programs," Proceedings of the 1998 ACM SIGPLAN-SIGSOFT workshop on Program analysis for software tools and engineering; pp. 35-42.

Nikhil, Rishiyur S. "An Overview of the Parallel Language Id," Digital Equipment Corporation, Cambridge Research Laboratory, Sep. 1993, pp. 1-21.

Tseng, Chau-Wen, "Compiler Optimizations for Eliminating Barrier Synchronization," PPOPP '95 Proceedings of the fifth ACM SIGPLAN symposium on Principles and practice of parallel programming; pp. 144-155.

Zheng et al., "Using Replication and Partitioning to Build Secure Distributed Systems," University of Pennsylvania ScholarlyCommons Departmental Papers (CIS) Department of Computer & Information Science, dated May 11, 2003, pp. 1-17.

* cited by examiner

```
?RUNUNDER WuId(1);    ← 308
    statement A1
    statement A2
?RUNUNDER WuId(2);
    statement B1
    statement B2
?RUNUNDER WuId(1);
    statement C1
    statement C2
```

302 →
304 — ?RUNUNDER WuId(1);
306a { statement A1 / statement A2
306b { statement B1 / statement B2
306c { statement C1 / statement C2

FIG. 3

SYNCHRONIZING MULTI-SYSTEM PROGRAM INSTRUCTION SEQUENCES

BACKGROUND

The present invention relates to system testing, and more specifically, to programming system test cases.

Work units are groups of tasks or work that is performed by a processing system. When writing source code or analyzing source code, previous methods for organizing the code are prone to errors. These methods can be laborious and can be particularly challenging when work units called in the source code are present in different address spaces and on different systems.

SUMMARY

According to an embodiment of the present invention, a method for processing code, the method comprises receiving a list of steps that includes a step associated with a first work unit and a step associated with a second work unit, and initializing each work unit associated with a step in the list of steps, wherein the first work unit is operative to process the list of steps by determining whether a first step in the list of steps is associated with the first work unit, determining whether a step sequentially listed prior to the first step has been completed responsive to determining that the first step in the list of steps is associated with the first work unit, processing the first step and designating the first step complete responsive to determining that the step sequentially listed immediately prior to the first step has been completed, determining whether a second step in the list of steps is associated with the first work unit, determining whether a step sequentially listed immediately prior to the second step has been completed responsive to determining that the second step in the list of steps is associated with the first work unit, and delaying processing the second step responsive to determining that the step sequentially listed immediately prior to the second step has not been completed.

According to another embodiment of the present invention, a processing system comprises a memory operative to store code, a processor operative to process the code the processor operative to receive a list of steps that includes a step associated with a first work unit and a step associated with a second work unit, and initialize each work unit associated with a step in the list of steps, wherein the first work unit is operative to process the list of steps by determining whether a first step in the list of steps is associated with the first work unit, determining whether a step sequentially listed prior to the first step has been completed responsive to determining that the first step in the list of steps is associated with the first work unit, processing the first step and designating the first step complete responsive to determining that the step sequentially listed immediately prior to the first step has been completed, determining whether a second step in the list of steps is associated with the first work unit, determining whether a step sequentially listed immediately prior to the second step has been completed responsive to determining that the second step in the list of steps is associated with the first work unit, and delaying processing the second step responsive to determining that the step sequentially listed immediately prior to the second step has not been completed.

According to another embodiment of the present invention, a computer program product comprising a computer readable storage medium having program instructions embodied therewith, the program instructions executable by a processor to cause the processor to perform a method comprises receiving a list of steps that includes a step associated with a first work unit and a step associated with a second work unit, and initializing each work unit associated with a step in the list of steps, wherein the first work unit is operative to process the list of steps by determining whether a first step in the list of steps is associated with the first work unit, determining whether a step sequentially listed prior to the first step has been completed responsive to determining that the first step in the list of steps is associated with the first work unit, processing the first step and designating the first step complete responsive to determining that the step sequentially listed immediately prior to the first step has been completed, determining whether a second step in the list of steps is associated with the first work unit, determining whether a step sequentially listed immediately prior to the second step has been completed responsive to determining that the second step in the list of steps is associated with the first work unit, and delaying processing the second step responsive to determining that the step sequentially listed immediately prior to the second step has not been completed.

BRIEF DESCRIPTION OF THE DRAWINGS

FIG. 3 illustrates an exemplary embodiment of a list of steps.

DETAILED DESCRIPTION

Computer programs may run in parallel using parallel processing or sequentially. Often the programs include work units that include different tasks and sub-tasks. In the embodiments described herein, the work units include statements, which are instructions performed by a work unit.

When testing software (computer programs), such as, for example, an operating system, test cases are written by a programmer to test features of the software. The test case programs often include a sequence of instructions that perform testing tasks that verify that the software operates properly. Though the test cases may follow a relatively direct logical sequence (i.e., open a file, run a file, error check the file, close the file) the source code used to program such a test case may become complicated when multiple work units are used to perform the desired tasks. Such code can become particularly complicated when the work units are run in different address spaces on different systems.

The methods and systems described herein provide a user with a method for writing a program as a sequence of instructions by allowing a user to specify which work unit will perform particular instructions and synchronizing the work units' execution such that the intended sequence of instructions is performed in a straight forward logical arrangement.

Figure 1:
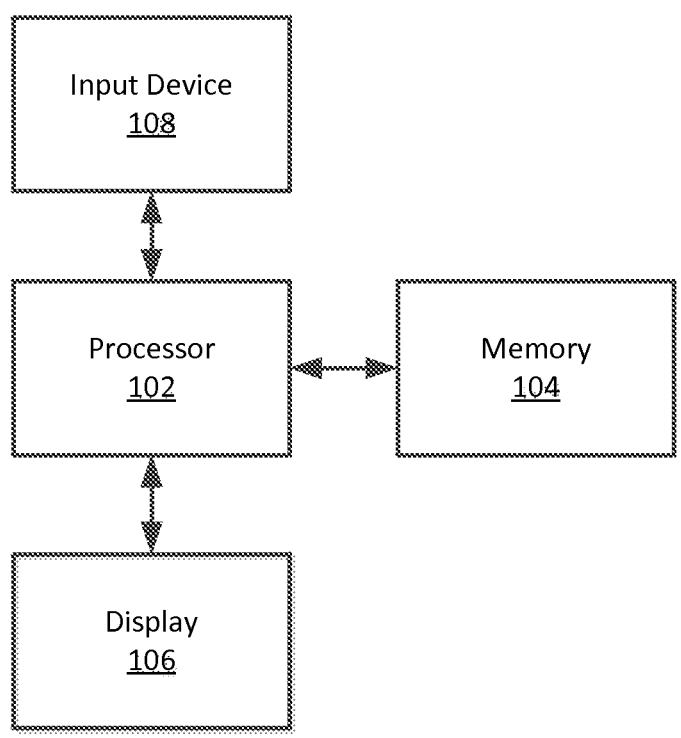
FIG. 1 illustrates a block diagram of a processing system.

The exemplary embodiments discussed herein provide a user with a clearer and simpler coding arrangement that facilitates efficient source code development, troubleshooting and modification. FIG. 1 illustrates an exemplary embodiment of a system 100 that includes a processor 102 that is communicatively connected to a memory 104, a display device 106, and an input device 108. The processor 102 may include a single processor or multiple processors that are communicatively connected to cooperate in performing processing tasks.

Figure 2:
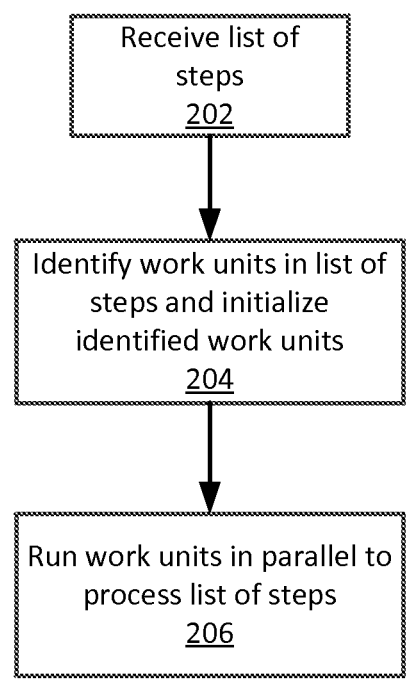
FIG. 2 illustrates a flow diagram of an exemplary method of operation of the processing system of FIG. 1.

FIG. 2 illustrates a flow diagram of an exemplary method of operation that may be performed by the system 100 (of FIG. 1). In this regard, in block 202 the system 100 receives a list of steps. Each step includes one or more statements or groups of statements. A statement may include any processor tasks or instructions such as, for example, opening a file, running a file, checking a file for errors, or closing a file that may be performed by a work unit. The work unit is operative to execute or run statements.

In block 204, the work units are identified in the list of steps and the work units are initialized to begin processing. In block 206, the work units are run in parallel to process the list of steps sequentially. Thus, each initialized work unit will work through the list of steps from the perspective of the work unit. The work units may process steps in the list of steps simultaneously in some instances however, the each work unit follows the list of steps sequentially, and will wait until previous steps in the sequence are designated as being complete (e.g., in a table that lists the steps and the completion status of the steps) prior to processing steps associated with the work unit. Block 206 will be described in further detail in FIG. 4 below.

FIG. 3 illustrates exemplary embodiments of similar instructions that include lists of steps that are designated to particular work units for execution. The list of steps 302 includes "RUNUNDER" instructions 304 that designate particular work units. In the illustrated example, work units are designated by work unit (Wu) identification (Id) numbers (e.g., WuId(1), WuId(2)). Each of the steps 306 includes one or more statements 308. The statements 308 are individual tasks or instructions that are performed by a work unit. Though the illustrated embodiment of the list of steps 302 is shown in one programming language, a similar scheme may be coded using a variety of alternative programming languages in alternate embodiments.

Figure 4:
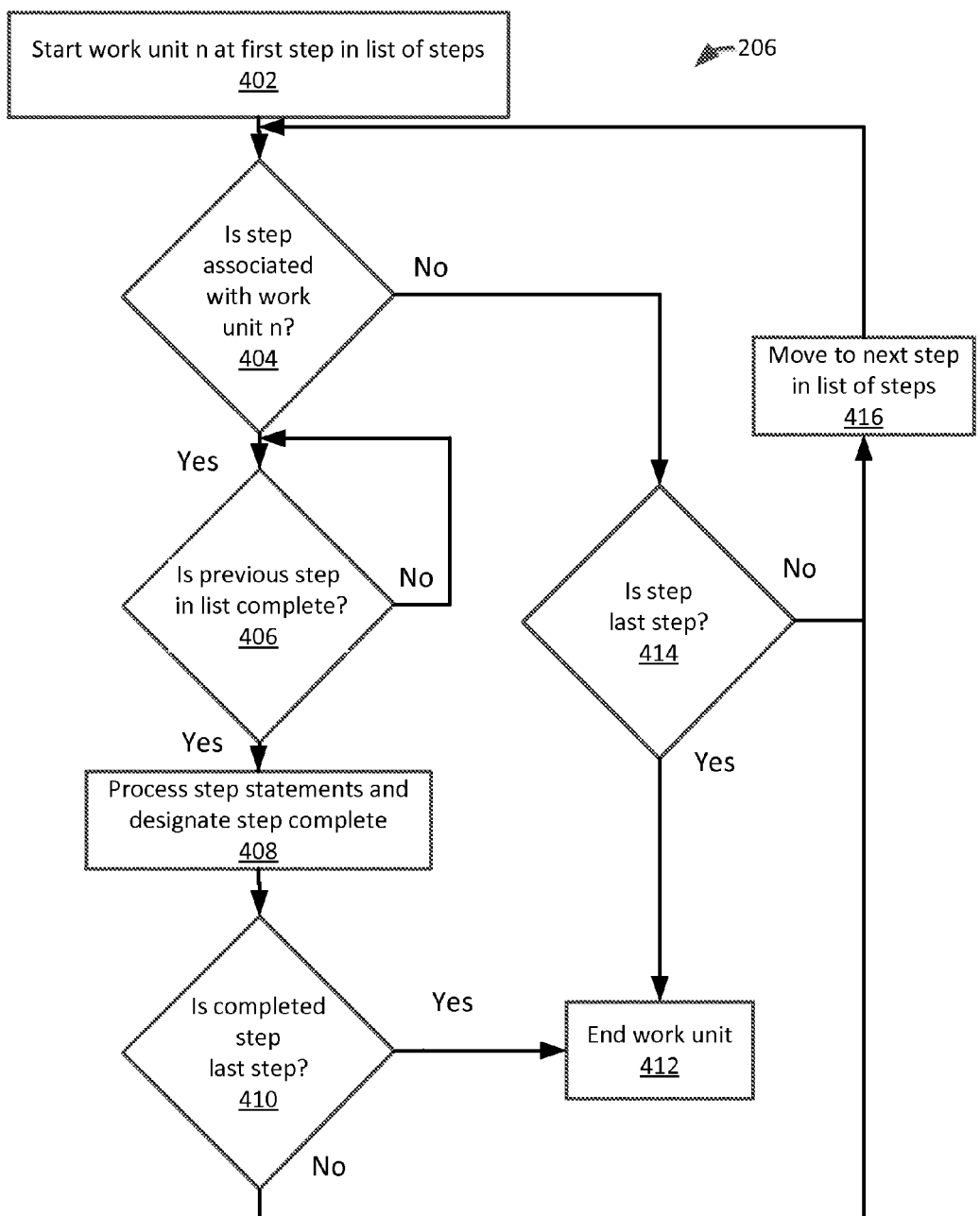
FIG. 4 illustrates a flow diagram of the process described in block 206 of FIG. 2.

FIG. 4 illustrates a flow diagram that describes in detail the processing of steps as described above in block 206 of FIG. 3. Referring to FIG. 4, in block 402 the system 100 (of FIG. 1) starts at a work unit n at a first step in the list of steps. Work unit n is one work unit of a group of work units n. In block 404, the system 100 determines whether the step is associated with the work unit n. If yes, the system 100 determines in block 406 if the previous step in the list of steps has been completed. If no, the system 100 determines if the step that is not associated with the work unit n is the last step in block 414. If the answer to block 404 is yes, the work unit processes the step statements and designates that the step is complete following the processing in block 408. The step may be designated or indicated as complete by, any suitable method including, for example, a table or other file arrangement that is stored in a memory that includes indicators or flags that indicate when a step listed in the table has been completed. In block 410, the system 100 determines whether the completed step is the last step in the list of steps. If yes, the work unit is ended or closed in block 412. If no, the system 100 moves to the next step in the list of steps in block 416.

The following describes an example of the operation of the system 100 (of FIG. 1) referring to the flow diagram of FIG. 4 and the list of steps 302 of FIG. 3. In this regard, FIG. 3 includes a list of steps 302 that includes two work units: work unit 1 (WuId (1)) and work unit 2 (WuId (2)). The list of steps 302 includes steps 306a, 306b, and 306c. The steps 306 include statements 308 where statement A1 and statement A2 are included in step 306a, statement B1 and statement B2 are included in step 306b, and statement C1 and statement C2 are included in step 306c. The list of steps is processed the work units 1 and work units 2, which may work in coordination to process the steps 306 sequentially.

Referring to FIG. 4, in block 402 the first work unit WuId1 is started when the "RUNUNDER WuId (1)" instruction is processed by the system 100. When the work unit is started, it is considered the active work unit. The first step 306a is the first step in the list of steps 302. In block 404 the system 100 determines if the step 306a is associated with the work unit 1. Since the step 306a is under the "RUNUNDER WuId (1)" instruction, the step is indeed associated with the work unit 1. In block 406, the previous step is complete, since there are no previous steps. In block 408, the system 100 processes the step 306a by processing/running the statement A1 and A2. After step 306a is completed and designated complete, the system 100 determines whether the completed step 306a is the last step sequentially in the list of steps 302. At this point, the answer is no, and the system 100 moves to process the next step (306b) in the list of steps 302 in block 416.

In the list of steps 302, the step 306b is associated with the work unit 2 as shown by the "RUNUNDER WuId (2)" that is listed prior to the step 306b. Thus, in block 404, the step 306b is not associated with the work unit 1. The system 100 determines if the step 306b is the last step in block 414. In this example, step 306b is not the last step, so the system 100 moves to the next step (306c) in the list of steps 302.

In block 404, the system 100 determines whether the step 306c is associated with the work unit 1. In the illustrated example, the step 306c is indeed associated with the work unit 1 as shown by the "RUNUNDER WuId (1)" that is listed prior to the step 306c. In block 406, the system 100 determines whether the previous step (step 306b) is completed. In the illustrated example, the previous step 306b has not been processed or designated complete, thus the answer to the question of block 406 is no. Thus, the method shown in FIG. 4 for the work unit 1 will continue to loop in block 406 until the previous step (step 306b) is completed.

In this regard, the work unit 2 follows the same method as shown in FIG. 4 to process the list of steps 302. Referring to FIG. 4 where the work unit 2 is the active work unit, in block 402, the work unit 2 is started at the first step (step 306a) in the list of steps 302 (of FIG. 3). In block 404 the system 100 (of FIG. 1) determines that the step 306a is not associated with the work unit 2 as shown by the "RUNUNDER WuId (1)" that is listed prior to the step 306a. Since the answer in block 404 is no, the system 100 determines whether the step 306a is the last step. The answer is no since steps 306c is the last step. In block 416, the system 100 moves to process the next step (step 306b) in the list of steps 302. In block 404, the system 100 determines whether the step 306b is associated with the active work unit (work unit 2). In the present example, the answer is yes as shown by the "RUNUNDER WuId (2)" that is listed prior to the step 306b. In block 406, the system 100 determines whether the previous step (306a) is complete. In the illustrated embodiment, the previous step (306a) has been completed as discussed above. Thus, the answer to block 406 is yes, and the system 100 process the step 306b and designates the step 306b as complete. In block 410 the system 100 determines whether the completed step is the last step 306 in the list of steps 302. At this point, the answer is no, so the work unit 2 may move to the next step (step 306c) in the list of steps 302 as directed by block 416.

The work unit 2 moves to the next step (306c) in the list of steps 302 in block 416, and determines in block 404 whether the step 306c is associated with the work unit 2. The answer is no since the step 306c is not associated with the work unit 2 as shown by the "RUNUNDER WuId (1)" that is listed prior to the step 306c. The work unit 2 moves to block 414 in the logic and determines that step 306c is indeed the last step in the list of steps 302. Thus, the work unit 2 moves to block 412 and ends the work unit 2.

As discussed above, the work unit 1 had progressed to process the step 306a and designated the step 306a complete. The work unit 2 did not process step 306a because step 306a was not associated with work unit 2. Work unit 2 moved on to process step 306b that is associated with work unit 2, but would only process step 306b after the previous step (306a) was complete as shown in block 406. Likewise, after the work unit 1 processed the step 306a, the work unit 1 proceeded to process the next step (step 306b) however, since the step 306b is not associated with work unit 1, the work unit 1 proceeded to process the step after 306b (step 306c) in the sequence of steps 302. However, the work unit 1 was prevented from processing the step 306c because at the time the work unit 1 moved to the next step (306c), the previous step (step 306b) had not been designated as being completed by the work unit 2. Thus the work unit 1 was looping in block 406.

After the work unit 2 designated the step 306b complete, the answer to the question 406 for work unit 1 regarding the processing of the step 306c is yes. Recall that the work unit 1 processed step 306a, skipped processing step 306b since 306b is associated with work unit 2, and moved to process step 306c. However, the work unit 1 continued the logical loop in block 406 for the process step 306c because the work unit 2 had not yet designated the step 306b as being complete.

At this point in the example, the answer to the question 406 became yes for work unit 1 when the work unit 2 designated the step 306b complete. Thus, the work unit 1 moves to block 408 (in FIG. 4) and processes the step 306c. Once the work unit 1 completes step 306c, the answer to the question in block 401 becomes yes since step 306c is the last step in the list of steps 302. Thus, the work unit 1 is ended in block 412.

The system and methods described above, provide a method for writing and processing source code that allows multiple work units to process steps simultaneously, while being coordinated in a simple sequentially arranged list of steps that designates particular work units for performing particular steps. The embodiments provide for more efficient coding, troubleshooting, and modification of code that uses work units that may exist in different address spaces or environments by providing steps associated with particular work units in a logical sequential sequence.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for processing code, the method comprising:
    receiving, by a processor, an instruction set including one or more program instructions assigned to a first work unit and one or more program instructions assigned to a second work unit; and
    initializing the first work unit and the second work unit, where the first work unit and the second work unit represent a separate processing resource within a computing system;
    wherein the processor is operative to process the instruction set by:
        determining that a first program instruction in the instruction set is assigned to the first work unit;
        responsive to determining that the first program instruction in the instruction set is assigned to the first work unit, determining that all prior program instructions to the first program instruction have been executed;
        responsive to determining that all prior program instructions to the first program instruction have been executed, executing, by the first work unit, the first program instruction;
        determining that a third program instruction in the instruction set is assigned to the first work unit;
        responsive to determining that the third program instruction is assigned to the first work unit, determine whether any prior program instructions to the third program instruction have been executed;
        responsive to determining that any prior program instructions to the third program instruction have not been executed, delaying executing the third program instruction by the first work unit;
        identifying a second program instruction from the prior program instructions to the third program instruction, wherein the second program instruction is assigned to the second work unit;
        responsive to identifying the second program instruction, determine that any prior program instructions to the second program instruction have been executed; and
        responsive to determining that any prior program instructions to the second program instruction have been executed, executing, by the second work unit, the second program instruction.

2. The method of claim 1, wherein the second program instruction is processed and designated as being complete by the second work unit before the first work unit processes the third program instruction.

3. The method of claim 1, wherein the processor is further operative to:
    determining whether the first program instruction in the set of program instructions is the last program instruction in the instruction set responsive to determining that the first program instruction in the instruction set is not associated with the first work unit; and
    ending the first work unit responsive to determining that the first program instruction in the set of program instruction is the last program instruction in the instruction set.

4. The method of claim 1, wherein the processor is further operative to process the instruction set by:
    determining whether the first program instruction in the instruction set is the last program instruction in the instruction set responsive to determining that the first program instruction in the instruction set is not associated with the first work unit; and
    determining whether another program instruction immediately following the first program instruction in the instruction set is associated with the first work unit responsive to determining that the first program instruction in the instruction set is not the last program instruction in the instruction set.

5. The method of claim 4, wherein the processors is further operative to process the set of program instructions by processing the program instruction immediately following the first program instruction in the instruction set that is associated with the first work unit.

6. A processing system comprising:
a memory operative to store program instructions;
a processor operative to process the program instructions, the processor operative to:
receive an instruction set that includes one or more program instructions associated with a first work unit and one or more program instructions associated with a second work unit; and
initialize each work unit associated with a program instruction in the instruction set, wherein each work unit represents a separate processing resource within the processing system;
wherein the processor is operative to process the instruction set by:
determining that a first program instruction in the instruction set is associated with the first work unit;
responsive to determining that the first program instruction in the instruction set is assigned to the first work unit, determining whether that all prior program instructions to the first program instruction have been executed;
responsive to determining that all prior program instructions to the first program instruction have been executed, executing, by the first work unit, the first program instruction;
determining that a third program instruction in the instruction set is assigned to the first work unit;
responsive to determining that the third program instruction is assigned to the first work unit, determine whether any prior program instructions to the third program instruction have been executed;
responsive to determining that any prior program instructions to the third program instruction have not been executed, delaying executing the third program instruction by the first work unit;
identifying a second program instruction from the prior program instructions to the third program instruction, wherein the second program instruction is assigned to the second work unit;
responsive to identifying the second program instruction, determine that any prior program instructions to the second program instruction have been executed; and
responsive to determining that any prior program instructions to the second program instruction have been executed, executing, by the second work unit, the second program instruction.

7. The system of claim 6, wherein the second program instruction is processed and designated as being complete by the second work unit before the first work unit processes the third program instruction.

8. The system of claim 6, wherein the processor is further operative to process the instruction set by:
determining whether the first program instruction in the instruction set is the last program instruction in the instruction set responsive to determining that the first program instruction in the instruction set is not associated with the first work unit; and
ending the first work unit responsive to determining that the first program instruction in the instruction set is the last program instruction in the instruction set.

9. The system of claim 6, wherein the processor is further operative to process the instruction set by:
determining whether the first program instruction in the instruction set is the last program instruction in the instruction set responsive to determining that the first program instruction in the instruction set is not associated with the first work unit; and
determining whether another program instruction immediately following the first program instruction in the instruction set is associated with the first work unit responsive to determining that the first program instruction in the instruction set is not the last program instruction in the instruction set.

10. The system of claim 9, wherein the first work unit is further operative to process the instruction set by processing the program instruction immediately following the first program instruction in the instruction set is associated with the first work unit.

11. A computer program product comprising a computer readable storage medium having program instructions embodied therewith, the program instructions executable by a processor to cause the processor to perform a method comprising:
receiving, by the processor, an instruction set including one or more program instructions assigned to a first work unit and one or more program instructions assigned to a second work unit; and
initializing the first work unit and the second work unit, wherein the first work unit represents a first thread on the processor and the second work unit represents a second thread on the processor;
wherein the processor is operative to process the instruction set by:
determining that a first program instruction in the instruction set is assigned to the first work unit;
responsive to determining that the first program instruction in the instruction set is assigned to the first work unit, determining that all prior program instruction to the first program instruction have been executed;
responsive to determining that all prior program instructions to the first program instruction have been executed, executing, by the first work unit, the first program instruction;
determining that a third program instruction in the instruction set is assigned to the first work unit;
responsive to determining that the third program instruction is assigned to the first work unit, determine whether any prior program instructions to the third program instruction have been executed;
responsive to determining that any prior program instructions to the third program instruction have not been executed, delaying executing the third program instruction by the first work unit;
identifying a second program instruction from the prior program instructions to the third program instruction, wherein the second program instruction is assigned to the second work unit;
responsive to identifying the second program instruction, determine that any prior program instructions to the second program instruction have been executed; and
responsive to determining that any prior program instructions to the second program instruction have been executed, executing, by the second work unit, the second program instruction.

12. The method of claim 11, the second program instruction is processed and designated as being complete by the second work unit before the first work unit processes the third program instruction.

13. The method of claim 11, wherein the processor is further operative to process the instruction set by:
   determining whether the first program instruction in the list of steps is the last program instruction in the instruction set responsive to determining that the first program instruction in the instruction set is not associated with the first work unit; and
   ending the first work unit responsive to determining that the first program instruction in the instruction set is the last program instruction in the instruction set.

14. The method of claim 11, wherein the processor is further operative to process the instruction set by:
   determining whether the first program instruction in the instruction set is the last program instruction in the instruction set responsive to determining that the first program instruction in the instruction set is not associated with the first work unit; and
   determining whether another program instruction immediately following the first program instruction in the instruction set is associated with the first work unit responsive to determining that the first program instruction in the instruction set is not the last program instruction in the instruction set.

* * * * *